Figure 1:
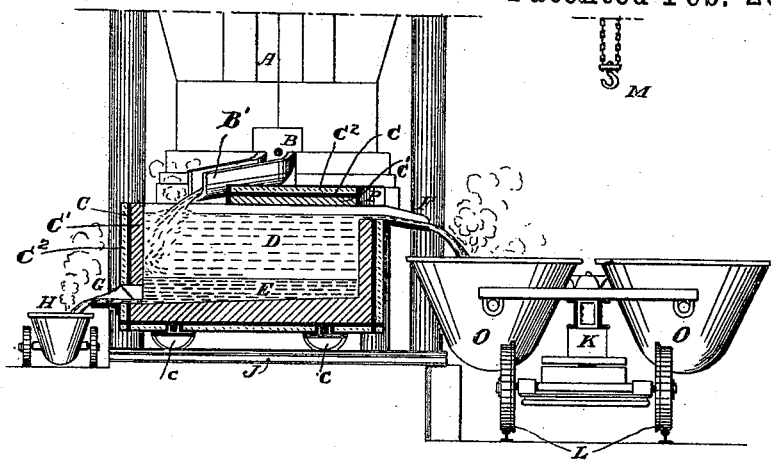

(No Model.)

M. W. ILES.
PROCESS OF SEPARATING MATTE FROM SLAG.

No. 515,081. Patented Feb. 20, 1894.

UNITED STATES PATENT OFFICE.

MALVERN W. ILES, OF DENVER, COLORADO.

PROCESS OF SEPARATING MATTE FROM SLAG.

SPECIFICATION forming part of Letters Patent No. 515,081, dated February 20, 1894.

Application filed December 21, 1891. Serial No. 415,696. (No specimens.)

*To all whom it may concern:*

Be it known that I, MALVERN W. ILES, of the city of Denver, county of Arapahoe, and State of Colorado, have invented a certain new and useful Process of Separating Matte from Slag, of which the following is a true and exact description, reference being had to the accompanying drawings, which form a part of this specification.

My invention relates to the process of separating and saving the particles of matte which issue from metallurgical furnaces in intermixture with the slag. This has been effected to a certain extent by several methods and my invention consists in running the matte bearing slag into a receptacle or fore-hearth, permitting the matte to settle by subsidence, then drawing the slag from the top and the matte from the bottom of the receptacle. More in detail the process also embodies:—first, maintaining the slag and matte in a fluid state by the use of non-conducting walls to the fore-hearth; second the delivery of the slag to the fore-hearth in a direction opposite to one of its sides and drawing the slag from the opposite side, preferably the fore-hearth being of elongated form and the slag being delivered toward and drawn from its opposite shorter sides.

In the drawings I have illustrated an apparatus especially designed for use with my process, and which in some of its features will form the subject matter for another application for Letters Patent.

Figure 2:
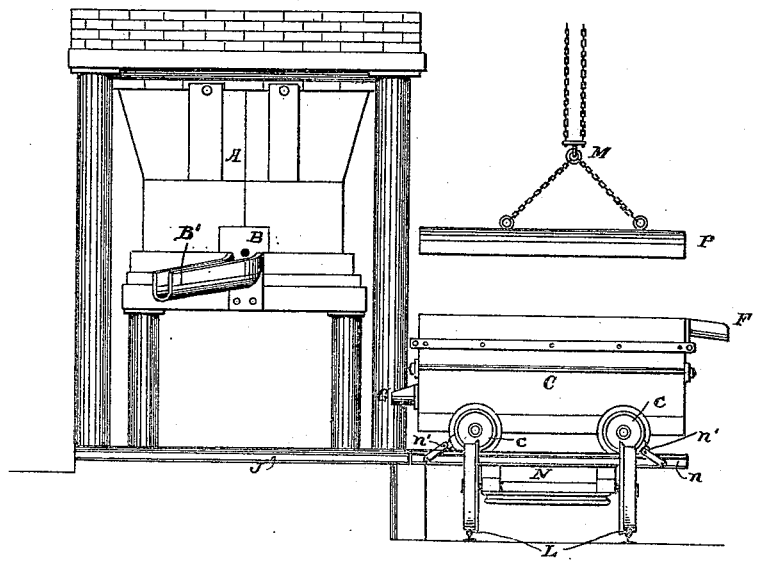

Figure 1. is an illustration of the bottom of a furnace showing a matte box or fore-hearth in cross section, and also Nesmith slag pots in position to receive the slag, and Fig. 2, is a similar view showing the devices for removing the fore-hearth.

A. is the furnace, B the slag opening, B' the slag spout which is curved as shown so as to deliver the slag near one side of the fore-hearth C. which is, as shown, an elongated receptacle mounted on wheels $c$ $c$, provided with a fire-brick lining C. and, to make it less conductive of heat, having also a non-conducting outer jacket $C^2$.

F. is the slag spout at the top of the fore-hearth and opposite to the side against which the slag is delivered by spout B', and G. is the tap hole for the matte.

The dark shading E indicates matte and the light shading D. slag. The fore-hearth has a cover P suitably lined within and without to prevent escape of heat, and which should substantially cover the whole top, except where it is cut away beneath the mouth of spout B'.

H is a matte pot placed to receive matte from spout G, and O. O. are slag pots pivotally mounted on a truck K which runs on tracks L. placed transversely to, and at a lower level than the short tracks J on which the fore-hearth is supported.

Fig. 2 shows a truck running on tracks L. and having tracks $n$ supported on it which register with the ends of tracks J. when the truck is properly placed, $n'$ $n'$ being stops to hold the fore-hearth in position when it is run onto tracks $n$, as in Fig. 2, M indicates a hoisting chain arranged to lift the cover P as shown.

The slag from furnace A runs from spout B' toward one of the shorter sides of the fore-hearth as shown while the slag is constantly passing out of this receptacle through the spout F. The particles of matte which are much heavier than the slag are thus aided in their natural tendency to separate and sink to the bottom, first by the impact against the side of the fore-hearth, and secondly by the fact that the lighter slag in the hearth has a movement in the opposite direction to that in which the fresh mixture is delivered, and the heavy matte resists the tendency to move toward spout F more forcibly than the lighter slag with which it is mixed; consequently, and especially in the elongated receptacle, the effect is to insure that practically no matte shall escape through the slag spout. The fluidity of the mass is maintained by its own heat which is prevented from escaping by the non-conducting walls of the hearth and its cover, and the accumulated matte in the bottom of the hearth is drawn off through spout H without interruption of the separating process.

I have found that it is a feature of some importance that the mixed matte and slag should enter the fore-hearth in close proximity to the matte tap, and therefore the spout B' is placed as shown so that its end will be above the tap G: by this construction the hot matte and slag is precipitated into the fore-hearth in such a way as to descend to or toward the matte tap, and fluidity at this point is insured.

The fore-hearth is made movable by the device shown and which will be claimed in another application, so that in case the box becomes closed or otherwise inoperative or defective another can be rapidly put in its place with the least possible interruption of the process of separating.

Having now described my invention, what I claim as new, and desire to secure by Letters Patent, is—

1. The process of separating matte from slag which consists in running the matte-bearing slag into a deep fore-hearth at a point near, and in a direction opposite to one of its sides, drawing the slag from the top of the fore-hearth at a point substantially opposite to that toward which the slag is delivered to it, and drawing the matte from a point at or near the bottom of the receptacle.

2. The process of separating matte from slag, which consists in running the matte bearing slag into an elongated fore-hearth at a point near and in a direction opposite to one of its shorter sides, drawing the slag from the top of the fore-hearth at the side opposite to that toward which the slag enters the receptacle, and drawing the matte from a point at or near the bottom of the receptacle.

In witness whereof I have hereunto set my hand.

MALVERN W. ILES.

Witnesses:
J. H. TUCKER,
F. P. McCORMICK.